United States Patent [19]
Yamazaki et al.

[11] Patent Number: 4,482,362
[45] Date of Patent: Nov. 13, 1984

[54] METHOD FOR PRODUCING PURIFIED GASES

[75] Inventors: Norio Yamazaki, Itami; Naoyoshi Takaoka, Tondabayashi; Mikio Shinoki, Matsubara; Ryonosuke Huruichi, Toyonaka, all of Japan

[73] Assignee: Taiyo Sanso Co., Ltd., Osaka, Japan

[21] Appl. No.: 459,564

[22] Filed: Jan. 20, 1983

[30] Foreign Application Priority Data

Jan. 26, 1982 [JP] Japan .................................. 57-11084

[51] Int. Cl.³ ............................................. B01D 53/04
[52] U.S. Cl. ......................................... 55/62; 55/68; 55/75
[58] Field of Search ................... 55/25, 26, 31, 33, 35, 55/58, 62, 68, 74, 75, 179, 180, 387, 389

[56] References Cited

U.S. PATENT DOCUMENTS

| | | | |
|---|---|---|---|
| Re. 31,014 | 8/1982 | Sircar | 55/26 |
| 1,617,305 | 2/1927 | Guyer et al. | 55/58 |
| 3,377,812 | 4/1968 | Garrett et al. | 55/62 X |
| 3,398,506 | 8/1968 | Baldus | 55/68 X |
| 3,841,058 | 10/1974 | Templeman | 55/33 |
| 3,897,226 | 7/1975 | Doherty | 55/33 |
| 3,944,400 | 3/1976 | Bird | 55/62 X |
| 4,011,065 | 3/1977 | Munzner et al. | 55/62 X |
| 4,015,956 | 4/1977 | Munzner et al. | 55/62 X |
| 4,256,469 | 3/1981 | Leitgeb | 55/25 |
| 4,259,091 | 3/1981 | Benkmann | 55/58 X |
| 4,340,398 | 7/1982 | Doshi et al. | 55/62 X |
| 4,376,639 | 3/1983 | Vo | 55/26 |
| 4,376,640 | 3/1983 | Vo | 55/26 |

FOREIGN PATENT DOCUMENTS

652956 3/1979 U.S.S.R. .................. 55/62

Primary Examiner—Robert Spitzer
Attorney, Agent, or Firm—Griffin, Branigan & Butler

[57] ABSTRACT

A system for purifying gas in which one or more main adsorbers containing a gas-adsorbent comprising a molecular sieve carbon (MSC) or the like is connectable in series to a supplementary adsorber containing a substantially smaller amount of the gas-adsorbent in the range of from 5 to 50% of the adsorbent contained in the main gas-adsorbers. The main gas-absorbers are connectable in parallel so that when the gas-adsorbent in one of the main absorbers is being regenerated, and vice versa, the other main gas-adsorber can function independently to adsorb gas or can be connected in series with said supplementary gas-adsorber so that the purification of gas can be continuously effected while one or the other of the main gas adsorbers is being regenerated. The supplementary gas absorber, when connected in series with either of the main adsorbers, functions to effectively finish or substantially complete utilization of the gas-adsorbent in the main adsorbers so that the adsorbers are utilized to maximum efficiency during a minimal time interval.

4 Claims, 8 Drawing Figures

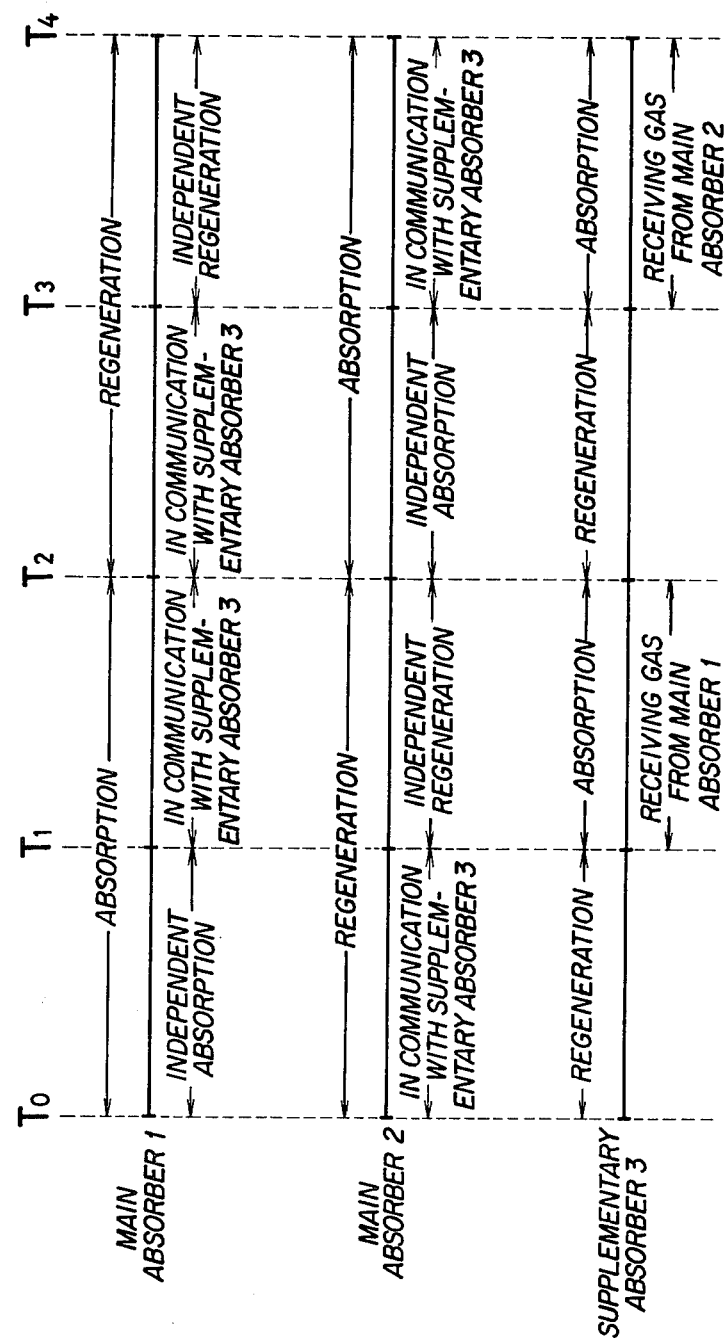

METHOD FOR PRODUCING PURIFIED GASES

BACKGROUND OF THE INVENTION

The present invention relates to an improved method for purifying gases, in which one or more main adsorbers are connected with a supplementary adsorber having a lesser capacity than the main adsorber(s) with the result that a highly purified gas is efficiently produced while using a minimal amount of adsorbent.

DESCRIPTION OF THE PRIOR ART

Generally, there have been two methods for purifying or separating a particular desired gas (product gas) from a mixture of gases utilizing an adsorbent which selectively adsorbs the specific or desired end-product gas.

One method is that of providing a pressure differential between an adsorption process and a desorption process. The other is a method of providing a temperature differential between the adsorption and desorption processes. The former does not require a heating and cooling cycle and enables the adsorption and desorption processes only by providing the pressure differential. This method has been widely adopted. The method of this invention adopts the pressure differential principles of the separation of gases.

A high degree of purification of gases is required in accordance with the demands of present day technology. To meet such requirements, some methods are provided which are, for example, methods in which some of a unit process of adsorption and regeneration are connected successively in series, as shown, for example, in Japanese Patent No. 54 (1979)-17595. Another method in which a part of a product gas is returned to the inlet of an adsorber, is shown in Japanese Patent (application laid open) No. (1973)-92292; and, another method in which residual gas in an adsorption-completed adsorber is introduced into a regeneration-completing adsorber, thereby making an effective use of the residual gas, is shown in Japanese Patent No. 56 (1981)-9442.

These prior art methods have certain disadvantages. For example, they utilize a considerable amount of a relatively expensive adsorbent. Further, the prior art gives rise to problems relating to achieving a ratio of acquisition of the product gas relative to the feed gas, which is quite expensive; and, utilizes a considerable amount of power. Also it is generally not as efficient as desired. According to the foregoing methods, as the purity of the gas is increased, the ratio of acquisition of the product gas which is defined as: [quantity of the product gas ($Nm^3$)/quantity of the feed gas ($Nm^3$)] and adsorption efficiency [flux of the product gas ($Nm^3/h$)/amount of adsorbent ($m^3$)] are lowered substantially with resulting increased costs and greater power consumption.

SUMMARY

A primary object of the present invention is to provide a system or systems which solve problems of the foregoing prior art methods. Another object of this invention is to provide a method in which one or more main adsorbers and a supplementary adsorber—the latter having less adsorbent than the main adsorber—are systematically connected with each other and operate in combination so that a highly purified gas product can be produced at an unusually high ratio of acquisition (as defined above) and with high facility efficiency (also as defined above) by means of a unit of the adsorption and regeneration processes.

According to conventional methods for purifying a gas in which a molecular sieving carbon (MSC), zeolite group adsorbents, silica gel adsorbent and the like are used, introduction of a feed gas and the adsorption process are stopped when the product gas at the exit of the adsorber reaches a predetermined value.

The foregoing and other objects, features and advantages of the invention will become apparent from the following more specific description of preferred embodiments of the invention, as illustrated in the accompanying drawings in which like reference characters refer to the same parts throughout the different views. These drawings are intended to be illustrative, only, are not restrictive, and are not intended to be to scale, emphasis instead is placed upon illustrating the principles of the invention.

BRIEF DESCRIPTION OF THE DRAWINGS

FIG. 7 is a time schedule graph showing scheduled operation of the two adsorbers of FIG. 6 in conjunction with a single supplementary adsorber; and, FIG. 8 shows the change of oxygen content in the product gas ($N_2$) in a purification process for nitrogen according to the embodiment of FIG. 6.

DESCRIPTION OF PREFERRED EMBODIMENTS

Figure 1:
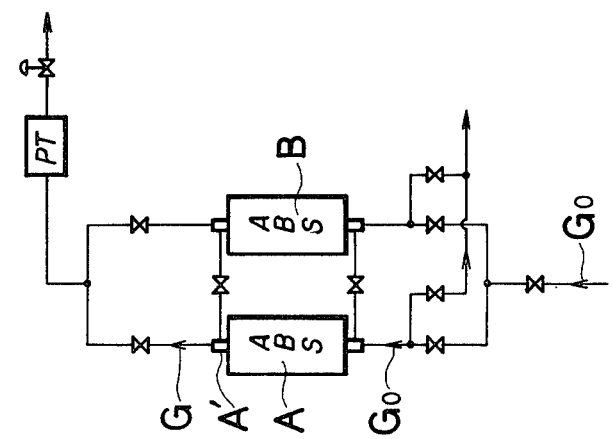
FIG. 1 is a diagrammatic representation of an apparatus for practicing a conventional method for purifying a gas using only two main adsorbers.
Figure 2:
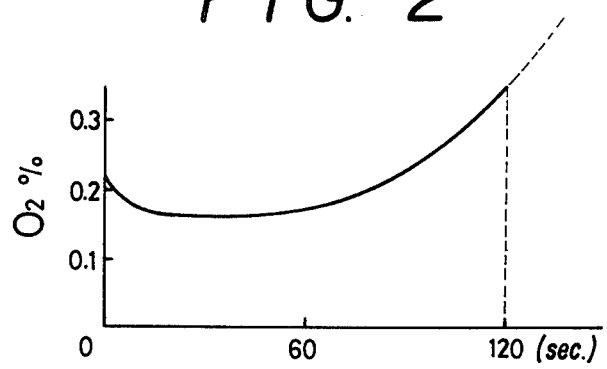
FIG. 2 graphically shows the change of oxygen content in a product gas obtained by the conventional method of the system of FIG. 1.

Turning first to FIGS. 1 and 2, this conventional system shows two main adsorbers A and B which are operated alternately. Nitrogen gas, through the use of MSC, is purified from a feed gas containing oxygen and nitrogen. When the oxygen content in the product gas measured at the exit A' of the working adsorber A reaches a predetermined critical value, the outflow of the product gas G and introduction of the feed gas $G^0$ are both stopped, thereby completing the adsorption process at the adsorber A.

FIG. 2 graphically shows changes, in accordance with passage of time, of oxygen content in the product gas G produced by the method shown in FIG. 1, with the oxygen content in the product gas G being controlled to average 0.2% by volume and reaching the minimum value of 0.16% at an early stage of adsorption, and 0.38% at the stage of completion of the adsorption. It is seen that the oxygen content in the product gas G, when measured at the time of completion of the adsorption, is almost twice as high as the average (mean) value of (0.2%). Although FIG. 2 indicates an increase of the oxygen content of the product gas G produced by the method using MSC as an adsorber, similar graphs showing the nitrogen content in the product gas (oxygen) are almost the same as that shown in FIG. 2 for oxygen when nitrogen is adsorbed by using other adsorbents, such as those of the zeolite-group of adsorbents. The same essentially applies to absorption and removal of moisture and carbon dioxide contained in air.

It is apparent from FIG. 2 that if the adsorption process continues after reaching about 0.38%, at the time of completion of the adsorption, the oxygen content in the product gas G rises further, as the dotted line on FIG. 2 indicates. However, the oxygen content in the gas left to flow out continually after reaching 0.38% is essentially lower than that in the feed gas $G_0$. The inventors noted this fact and found that improvements of methods of purifying gases are possible, with the above-defined ratio of acquisition and facility efficiency being raised, by putting to an effective use gas left to flow continually.

Figure 3:
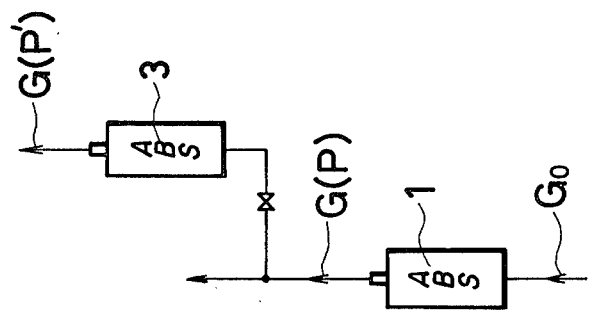
FIG. 3 is a diagrammatic illustration showing a basic form of the first embodiment of the present invention which incorporates a supplementary adsorber.

FIG. 3 illustrates a basic system incorporating a first embodiment of the invention providing a method for purification of a gas and an apparatus or system for performing the method. They can provide a ratio of acquisition and facility efficiency higher than conventional methods and apparatus. Experiments have been performed under various conditions such as types of adsorbents, shapes of adsorbers, types of feed gases and their flux, adsorption time, purity of product gas, methods of pressure-equalization and, so on.

Figure 4:
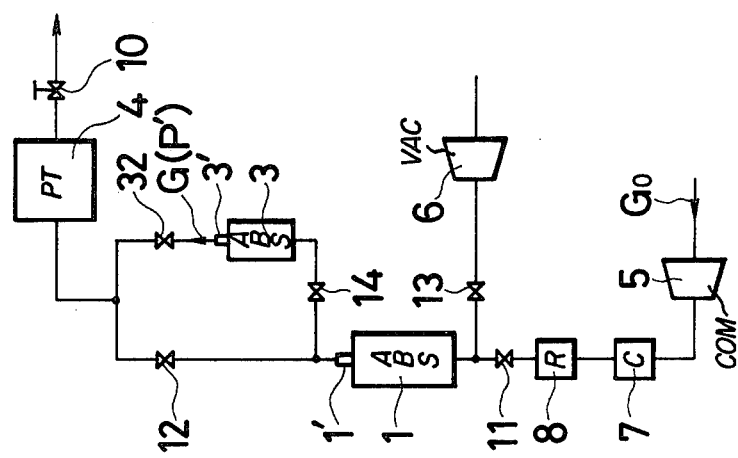
FIG. 4 is a diagrammatic illustration of a system for effecting the embodiment of the invention basically illustrated in FIG. 3.

Referring to FIGS. 3 and 4, there are shown a main adsorber 1 and a supplementary adsorber 3 (the latter having a lesser capacity than the main adsorber 1). Both are filled with a proper amount of adsorbent. Basic steps of the method are: (a) introducing a feed gas $G_0$ into the main adsorber 1 and discharging the product gas G out of outlet 1'; (b) connecting, in series, a supplementary adsorber 3 with the main adsorber 1 when the product gas G reaches a predetermined critical value P; and, (c) continually removing the product gas G from an outlet 3' of the supplementary adsorber 3 until a predetermined critical purity P' is reached.

As described above, the present invention substantially improves the purity of the product gas, the ratio of acquisition of the product gas, facility efficiency, power efficiency and so forth, in comparison with conventional methods and apparatus which utilize only a main adsorber(s) filled with the same amount of adsorbent as the present invention.

Referring further to the diagrammatic representation of the installation of FIG. 4 which shows the first embodiment of the invention, a main adsorber 1 has an outlet 1' which is connected by a suitable conduit to a supplementary adsorber 3 which in turn has an outlet 3' for the purpose of directing the outlet gas to a product tank 4. A compressor 5 suitably communicates to a cooler 7 which in turn is connected to a refrigerating apparatus 8, while a vacuum pump 6 may be connected to the main adsorber 1 between the cooler 7 and said adsorber. Suitable control valves 10, 11, 12, 13, 14 and 32 are provided between the various instrumentalities of the system, and will be described in detail as the description of the embodiment of FIG. 4 preceeds.

The main adsorber 1 is filled with MSC and this adsorbent is the means by which the product gas (nitrogen) is purified from a feed gas (air) $G_0$. MSC selectively adsorbs oxygen, but also adsorbs $CO_2$, moisture, and some nitrogen contained in the air. The supplementary adsorber is also filled with about 5 to 50% of the quantity of MSC adsorbent contained in the main adsorber 1.

During a first stage of the invention, air is pressurized by the compressor 5 up to a predetermined pressure level, e.g. 0–10 kg/cm²G, but preferably 2 to 7 kg/cm²G, and is cooled by dehumidification in cooler 7 and refrigerator 8. With the valves 13, 14, and 32 being closed, the valves 11 and 12 are open to convey the pressurized feed air $G_0$ to the main adsorber 1, with the product gas G being discharged through the valve 12 until purity of the product gas G reaches or nearly reaches a predetermined level. When the purity of the product gas G, measured, at the outlet 1' of the adsorber 1, reaches or nearly reaches the predetermined level, valves 14 and 32 are opened with valve 12 being closed to discharge the product gas through valve 32, with the main adsorber 1 and the supplementary adsorber 3 being connected in series communication.

When the purity P' of the product gas G at the outlet 3' of the supplementary adsorber reaches or nearly reaches its predetermined level or value, the valve 11 is closed and the adsorption process is stopped. Valve 32 is then closed and valve 13 is opened to depressurize the main adsorber 1 via the vacuum pump 6 thus regenerating the MSC adsorbent in both the main and supplementary adsorbers 1 and 3, respectively.

Although the adsorbent is indicated as being regenerated by means of the vacuum pump 6 in the disclosed embodiment, regeneration may also be accomplished by other methods such as, for example, the method in which a part of the product gas G is introduced through the outlet 3' of the supplementary adsorber 3 after the adsorbers 1 and 3 are depressurized to atmospheric pressure. Another method in which the adsorbers 1 and 3 are scavenged is by introducing a part of the product gas G while the vacuum of pump 6 is operating simultaneously with this reintroduction of the product gas G.

EXAMPLE I

Nitrogen was purified or removed from air using a single main adsorber 1 filled with 1.21 (i.e. 1.2 liters), by volume, of MSC having sieve pores averaging around 4Å in diameter, and one supplementary adsorber 3 was filled with 0.61 of MSC, under the following conditions:

pressure during the adsorption process: 0 kg/cm²G (pressure during regeneration by means of evacuation: at least 20 torr);

critical purity P of the product gas G discharged directly from the main adsorber: oxygen content of 6.2% by volume;

critical purity P' of the product gas G discharged from the supplementary adsorber: oxygen content of 5.4% time spent for adsorption at the main adsorber: 45 sec.;

time spent for adsorption at the main and supplementary towers communicated in series: 45 sec.; and, feed gas: 1.81/min.

As a result, 0.7761/min. of nitrogen with a (mean) average oxygen content of 5.0% by volume was taken out from the tank. The ratio of acquisition was 43.1% (0.776/1.8×100) and the adsorption efficiency was 26.0 Nm³/m³ (MSC)H (H stands for "hour").

An adsorption process according to a conventional method using only one main adsorber (without using a supplementary adsorber), however, was conducted under the following conditions:
  amount of MSC used: 1.8 l by volume,
  adsorption pressure: 0 kg/cm$^2$G,
  time for the adsorption process: 90 sec., and,
  feed gas: 1.25 l/min.,
0.405 l/min. of nitrogen with an average oxygen content of 5.5% was taken out from the tank, with the ratio of acquisition being 32.4% (0.405/1.25×100) and the adsorption efficiency being 13.5 Nm$^3$/m$^3$(MSC)H.

Comparing the two procedures, one observes an increase in the ratio of acquisition by 33%; an increase in adsorption efficiency of 93%; and, a decrease in power consumption of about 37% when using the present invention.

EXAMPLE II

Moisture content in hydrogen gas was adsorbed, using one main adsorber filled with 0.88 l of adsorbent (molecular sieve 5Å) and one supplementary adsorber filled with 0.22 l of adsorbent, under the following conditions:
  adsorption pressure: 3 kg/cm$^2$G; adsorption time for the main adsorber: 15 sec.;
  adsorption time for the main and supplementary adsorbers connected in series: 15 sec.;
  regeneration time: 30 sec.;
  hydrogen fed: 20° C. at temperature, 0° C. at the dew point and 241 Nl/min. flux;
and
  flux for scavenging for regeneration: 95 Nl/min.

As a result of the adsorption, hydrogen discharged at the outlet was 146 Nl/min. in flux and −40° C. at the dew point, with the ratio of acquisition being 60.5% (146/241×100), and the adsorption efficiency being 133 Nm$^3$/m$^3$(MSC) min. (note: 133=146/(0.88+0.22)).

In a comparative process, moisture was adsorbed, using only one adsorber (i.e., no supplementary adsorber) filled with 1.1 l of adsorbent, under the following conditions:
  adsorption pressure: 3 kg/cm$^2$G,
  adsorption time: 30 sec.
  regeneration time: 30 sec.,
  flux of hydrogen fed: 185 Nl/min., and
  flux for scavenging for regeneration: 95 Nl/min.

As a result, hydrogen discharged as the product gas was 90 Nl/min. in flux and −40° C. at the dew point, with the ratio of acquisition being 48.6 (90/185×100) and adsorption efficiency being 82 m$^3$/m$^3$(MSC) min.

In comparison with the conventional method, the present invention increased the ratio of acquisition by 24% and the adsorption efficiency by 62%.

The above-described embodiment of the present invention improves the purity of the product gas, ratio of acquisition, adsorption efficiency, and so on, over the conventional method, as described above.

Figure 5:
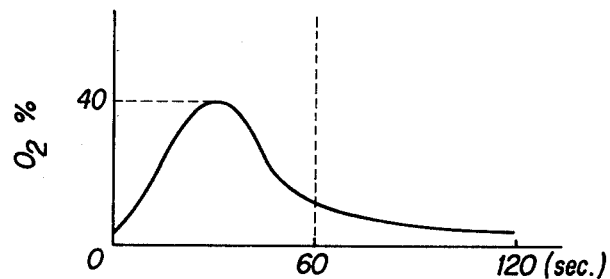
FIG. 5 graphically illustrates the change of oxygen content in gas that is evacuated by regeneration of the MSC adsorbent of the system of FIG. 4.

Analytical experiments were conducted on desorption of adsorbed oxygen from MSC adsorbent in connection with the MSC adsorbent regeneration process of the first embodiment shown in FIG. 4 and it was found that the oxygen content in the gas being evacuated for desorption of oxygen reaches a maximum value within a range of the first one third ($\frac{1}{3}$) to the first half ($\frac{1}{2}$) of the regeneration time and decreases rapidly after the peak, as shown graphically in FIG. 5. This means that desorption of oxygen from the MSC adsorbent is completed within a relatively short range of the desorption or regeneration time. This also applies to desorption from other adsorbents, for instance, desorption of nitrogen from a zeolite-group adsorbent.

A second embodiment of the present invention is based on the above stated findings relating to the regeneration characteristic of the adsorbents.

Particular attention was paid to the fact that the adsorption process at the supplementary adsorber is completed within a relatively short time (1) because of the aforegoing regeneration characteristic of the adsorbent and, (2) for the reason that the supplementary adsorber is filled with a relatively small amount of adsorbent. The second embodiment of the invention is based upon the above stated facts and the technical concept of the first embodiment as discussed above.

Figure 6:
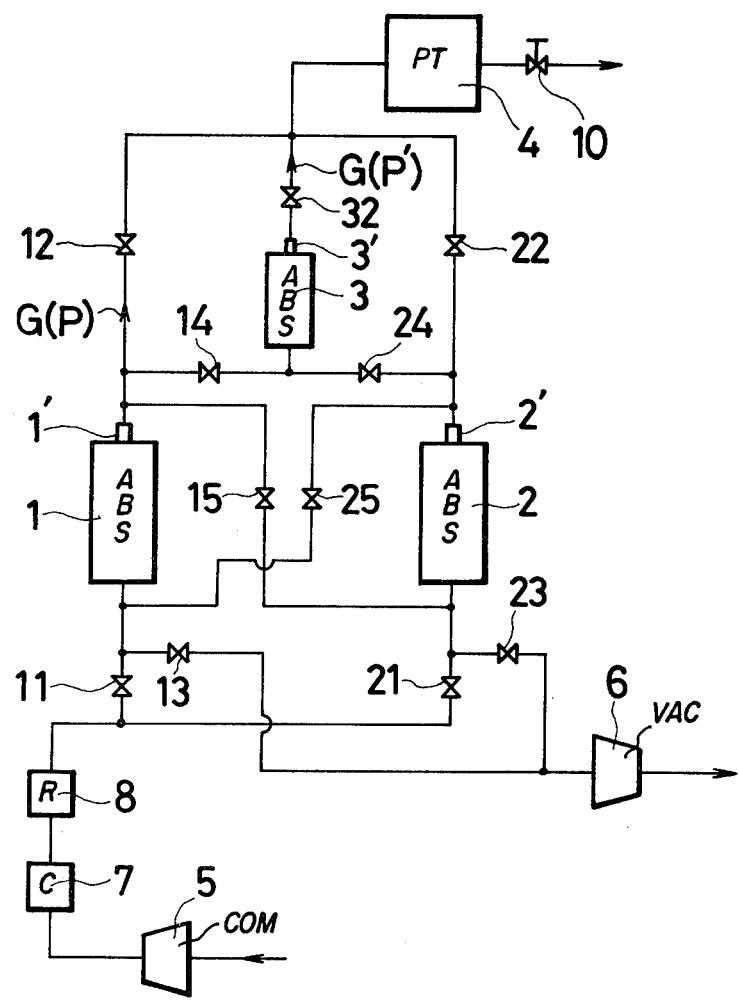
FIG. 6 shows diagrammatically a system for effecting a second embodiment of the invention in which two main adsorbers are utilized.

Referring to FIG. 6, the second embodiment uses two main adsorbers 1 and 2 and one supplementary adsorber 3. It comprises the steps of:

(a) carrying out, simultaneously, in parallel, the adsorption process at one main adsorber 1 filled with regenerated adsorbent and the desorption (regeneration) process at the other main and supplementary adsorbers 2 and 3 both filled with unregenerated adsorbent;

(b) connecting in series, the main adsorber 1 and the supplementary adsorber 3, to continually remove the product gas G from the outlet of the supplementary adsorber 3 when the product gas G at the outlet of the main adsorber 1 reaches or nears a predetermined critical value P, while the regeneration process at the other main adsorber 2 continually proceeds;

(c) completing the adsorption process at the main and supplementary adsorbers 1 and 3 when the product gas G discharged from the outlet of the supplementary adsorber 3 reaches or nears a predetermined critical value P'; and, (d) switching over the main and supplementary adsorbers 1 and 3 (both filled with unregenerated adsorbent) to the regeneration process after so-called pressure equalization, while the regenerated main adsorber 2 is switched over to the adsorption process.

The second embodiment also improves the ratio of acquisition, the adsorption efficiency, purity of the product gas and so on in comparison with the conventional methods merely using two main adsorbers, but no supplemental adsorber.

In FIG. 6, a diagrammatic representation of an installation for practicing the second embodiment, shows main adsorbers 1 and 2 each filled with a suitable MSC adsorbent, while a supplementary adsorber 3 is filled with less MSC adsorbent than that contained in the main adsorbers 1 and 2. Also shown in FIG. 6 is a product tank 4, a compressor 5, a vacuum pump 6, a cooler 7, a refrigerator 8, a flux regulating valve 10 and control valves 11, 12, 13, 14, 15, 21, 22, 23, 24, 25, and 32. The various conduits or connecting lines are not identified by reference numeral and it will be noted that the control valves are suitably connected between the various instrumentalities for affording operation of the second embodiment of the invention as will subsequently be described in detail.

Referring to FIG. 7, a time-schedule graph shows the cycles of adsorption and regeneration (desorption) processes of the main adsorbers 1 and 2 in conjunction with the time schedule of the supplementary adsorber 3. Each process of the adsorption and regeneration of each of the main adsorbers 1 and 2 is adjusted to be complete within a range of 1 to 3 minutes.

Referring to FIGS. 6 and 7, the system for effecting the second embodiment of the invention is described as follows:

The feed gas (air) $G_0$ is compressed to a predetermined pressure (0–10 kg/cm$^2$G) by the compressor 5 and is cooled down by the cooler 7 and further cooled by the refrigerator 8 for dehydration. The refrigerator 8 improves the adsorbability of the adsorbent.

Next, the valves 11 and 12 are opened to introduce the feed gas $G_0$ into the main adsorber 1 and discharge the product gas G (nitrogen) of a specific purity.

When the purity of the product gas G at the outlet 1' of the main adsorber 1 reaches or nears the predetermined critical value P at the time $T_1$ (see FIG. 7), the valves 12 and 24 are closed, with the valves 14 and 32 being opened, to connect, in series, the main adsorber 1 with the supplementary adsorber 3 so that the product gas G continually flows out through the valve 32 to the tank 4.

When purity of the product gas G at the outlet 3' of the supplementary adsorber 3 reaches or nears the predetermined critical value P', the valves 11, 14 and 32 are closed to stop the adsorption process ($T_1$ to $T_2$ in FIG. 7) conducted by the main and supplementary adsorbers 1 and 3, respectively, connected with each other in series. This follows the adsorption process ($T_0$ to $T_1$) conducted by the main adsorber 1 alone.

When the main adsorber 1 is utilized in the adsorption process, the other main adsorber 2 is in the regeneration process and vice versa.

The adsorption and regeneration (desorption) processes at the main adsorbers 1 and 2 respectively proceed in parallel. The regeneration is conducted during the time $T_0$ to $T_1$ at the respective main and supplementary adsorbers 2 and 3 while they are connected with each other in series, but is conducted at the main adsorber 2 alone during the succeeding time $T_1$ to $T_2$ after the supplementary adsorber 3 is disconnected from the main adsorber 2 at the time $T_1$ so as to be connected in series with the main adsorber 1 (i.e. after the supplementary adsorber 3 is switched over to the adsorption process from the regeneration process).

When the adsorption process at the main and supplementary adsorbers 1 and 3 is completed, valve 24 is opened to communicate the supplementary adsorber 3 with the regenerated main adsorber 2 and then valve 24 is closed. Also, valve 15 is opened to communicate the main adsorber 1 and the main adsorber 2, and then it is closed. Next, after valves 21 and 22 are opened to effect a pressure equilization between product tank 4 and the main adsorber 2, the feed gas G is introduced into the main adsorber 2 to remove the product gas $G_0$ according to the time table as with the main adsorber 1.

On the other hand, after the main adsorber 1 is depressurized to atmospheric pressure, with valves 13 and 14 being opened, the main and supplementary adsorbers 1 and 3 are connected in series and evacuated during the time $T_2$ to $T_3$ for regeneration of the adsorbents.

The regeneration (desorption) process is almost complete at the supplementary adsorber 3 at time $T_3$ because of the above-described characteristics of the adsorbent and further because the supplementary adsorber 3 is filled with a relatively small amount of adsorbent. Then, at $T_3$, the supplementary adsorber 3 is connected in series with the main adsorber 2 which is in the midst of its adsorption process.

The second embodiment is so formed that the adsorption and regeneration processes at the supplementary adsorber 3 are both completed during the adsorption process or the regeneration process in the main adsorbers 1 and 2.

Figure 8:
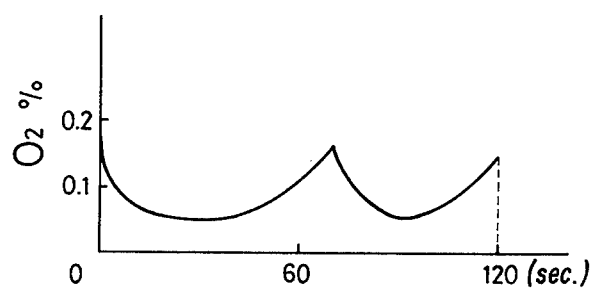

FIG. 8 shows change of oxygen content in accordance with passage of time in the product gas obtained by the second embodiment which is carried out under conditions that the second embodiment uses the same amount of MSC adsorbent as the conventional method shown in FIG. 1 and the discharge flux (Nm$^3$/.min) of the product gas is also the same as that obtained by the conventional method. The second embodiment provides a mean oxygen content of 0.11% by volume, 0.05% at the minimum and 0.18% at the maximum, with content difference therebetween being about 0.13%. FIG. 2, on the other hand, illustrates that the conventional method of FIG. 1 provides a difference between the maximum and minimum values of about 0.22%.

Comparison between the second embodiment and the conventional method of FIG. 1 indicates that the second embodiment can provide a product gas having more uniform purity than the conventional method; and, that the mean oxygen content is 0.2% according to the conventional method while it is 0.11% according to the second embodiment. Hence, there is a substantial improvement in the purity of the product gas that is obtained by the second embodiment.

The flux of the product gas obtained by the second embodiment is about 1.5 times as much as that provided by the conventional method if the second embodiment uses the same amount of adsorbent as the conventional method, and, further, if the mean oxygen content is controlled to stand at about 0.2% in the second embodiment.

Furthermore, if the second embodiment is practiced, having the same adsorption time, the same discharge flux (Nm$^3$) of the product gas obtained during the adsorption process, and the same oxygen content as the conventional method, the second embodiment needs less adsorbent than the conventional method. Compared with the conventional method, therefore, it is apparent that the second embodiment improves purity of the product gas; the ratio of acquisition; absorption efficiency; and, so on.

EXAMPLE III

Nitrogen was purified from air, with the main adsorbers 1 and 2 being filled with 1.9 l of MSC and the supplementary adsorber 3 being filled with 0.27 l of MSC, under the following conditions:

adsorption pressure: 3 kg/cm$^2$ (pressure for regeneration by evacuation: at least 80 torr),
critical purity P of the product gas discharged directly from the main adsorber: 0.17% O$_2$,
time for adsorption conducted by the main adsorber alone: 73 sec.;
time for adsorption by the main adsorber and the supplementary adsorber connected in series: 45 sec.; and,
supplied feed gas (air): 5.50 l/min.

As a result, 1.21 l/min. of nitrogen with a mean (average) oxygen content of 0.1% was obtained through the tank 4, with the ratio of acquisition being 22% (1.2 l/5.5×100), and the adsorption efficiency being 17.8 Nm$^3$/m$^3$(MSC)H.

In a conventional system, on the other hand, nitrogen was purified, with two adsorbers being filled with 2.035 l of MSC, under the following conditions:

adsorption pressure: 3 kg/cm$^2$G, adsorption time: 18 sec., and supplied feed gas (air): 4.37 l/min.

As a result, 0.760×/min of nitrogen with a mean oxygen content of 0.1% was obtained, with the ratio of acquisition being 17.4% (0.760/4.37×100) and the adsorption efficiency being 11.2 Nm$^3$/m$^3$(MSC)H.

As seen from the foregoing, the present invention increases the ratio of acquisition by 26% and the adsorption efficiency by 59%, and further decreases power consumption by about 40% in comparison with the conventional method.

EXAMPLE IV

Nitrogen was purified from the feed gas adsorbers 1 and 2 being filled with 1.9 l of MSC each and the supplementary adsorber 3 being filled with 0.39 l of MSC under the following conditions:

adsorption pressure: 3 kg/cm$^2$G (pressure for regeneration by evacuation: at least 80 torr), critical purity P of the product gas discharged directly from the main adsorber: 0.10% O$_2$;

critical purity P' of the product gas discharged from the supplementary adsorber: 0.18% O$_2$;

time for adsorption by the main adsorber alone: 58 sec.;

time for adsorption by the main and supplementary adsorbers connected in series: 60 sec.; and supplied feed gas: 6.52 l/min.

As a result, 2.47 l/min. of nitrogen with a mean oxygen content of 0.1% was obtained, with the ratio of acquisition being 37.8% and the adsorption efficiency being 35.4 Nm$^3$/m$^3$(MSC)H.

In a conventional system, on the other hand, nitrogen was purified from the feed gas, with two adsorbers being filled with 2.095 l of MSC each, under the following conditions:

adsorption pressure: 3 kg/cm$^2$ G, adsorption time: 118 sec., and supplied feed gas: 6.24 l/min.

As a result, 2.22 l/min. of nitrogen with a mean oxygen content of 0.1% was obtained with the ratio of acquisition being 35.6% and the adsorption efficiency being 31.8 Nm$^3$/m$^3$(MSC)H.

The present invention increases the ratio of acquisition by 6.2% and the adsorption efficiency by 11%, and further decreases power consumption by about 10%, in comparison with the conventional method.

The above stated Examples III and IV show that the second embodiment increases the ratio of acquisition, the adsorption efficiency, and so on in comparison with the conventional method in which only two main adsorbers are used.

Examples III and IV relate to the purification of nitrogen from air with use of MSC adsorbent. However, the Examples III and IV also apply, to the use of adsorbents such as synthetic zeolite, natural zeolite, silica gel and so on; and, to other gases such as removal of CO$_2$ or moisture in the air, adsorption of nitrogen in the air to provide oxygen as the product gas, production of hydrogen from hydrogen-containing gas, purification of helium from helium-containing gas, purification of nitrogen from combustion exhaust gas, and so on, in which the adsorption or purification process is conducted with the result of high adsorption efficiency and high rate of acquisition.

The capacity of the supplementary adsorber 3, the cycle time of the adsorption and regeneration and the method of pressure equalization, and so on are all appropriately determined depending upon the type of feed gas, the type of adsorber, the desired purity of the product gas and other such factors.

The Example V set forth below relates to adsorption of moisture from air by means of the second embodiment, and shows explicit superiority of the present invention with respect to the ratio of acquisition, the adsorption efficiency and so on.

EXAMPLE V

Moisture was adsorbed from air by means of a 13X molecular sieve used as an adsorbent, with the two main adsorbers each being filled with 1.9 l of adsorbent and the supplementary adsorber being filled with 1 l of adsorbent, under the following conditions:

adsorption pressure: 3 kg/cm$^2$G, time for adsorption by the main adsorber alone: 60 sec., time for adsorption by the main adsorber and the supplementary adsorber connected in series: 60 sec., supplied feed gas: 20° C. at temperature, 0° C. at the dew point and 828 l/min. in flux, and flux for regeneration: 198 l/min.

As a result, the discharged product gas at the outlet was 630 l/min. and −17.5° C. at the dew point, with the ratio of acquisition being 76.1% and the adsorption efficiency being 131 Nm$^3$/m$^3$(MSC) min.

In a conventional system, on the other hand, moisture was adsorbed from air, with two adsorbers being filled with 2.4 l of adsorbent each, under the following conditions.

adsorption pressure: 3 kg/cm$^2$G, adsorption time: 120 sec., supplied feed gas: 685/min., and regeneration flux: 198/min.

As a result, the discharged product gas (air) at the outlet was 487 l/min. and −17.5° C. at the dew point, with the ratio of acquisition being 71.1% and the adsorption efficiency being 101 Nm$^3$/m$^3$(MSC) min.

It is clear from comparison that the present invention increases the ratio of acquisition by 7% and the adsorption efficiency by 30%.

According to the second embodiment shown in FIGS. 6 and 7, adsorbent is regenerated by evacuating the main adsorbers and supplementary adsorber with use of the vacuum pump 6. Regeneration can also be conducted by: (1) depressurizing the adsorbers by communicating the adsorbers with the atmosphere; or, (2) depressurizing the adsorbers by the above-stated communication of the adsorbers with the atmosphere and further scavenging the adsorbers with product gas. Examples VI and VII stated below adopt the latter.

EXAMPLE VI

Nitrogen was purified from air, with the two main adsorbers filled with 1.9 l of MSC each and the supplementary adsorber with 0.39 l of MSC and the regeneration being conducted by communicating the adsorbers with the atmosphere and further by scavenging the adsorbers with product gas.

The purification of nitrogen was carried out under the following conditions:

adsorption pressure: 3 kg/cm$^2$G critical purity P of the product gas discharged directly from the main adsorber: 2.4% O$_2$, critical purity P' of the product gas discharged from the supplementary adsorber: 2.3% O$_2$, time for adsorption by the main adsorber and the supplementary adsorber connected in series: 30 sec., supplied feed gas: 7.30 Nl/min., and amount of a part of the product gas for scavenging the adsorbers for regeneration: 0.5 Nl/min.

As a result, 1.54 Nl/min. of nitrogen with mean oxygen content of 2.0% was obtained through the tank, with the ratio of acquisition being 21.1% ($1.54/7.30 \times 100$) and the adsorption efficiency being 22.1 $Nm^3/m^3(MSC)H$.

In a conventional system, on the other hand, purification of nitrogen was carried out, with two adsorbers being filled with 2.095 l of MSC each, under the following conditions:

adsorption pressure: 3 $kg/cm^2G$, adsorption time: 58 sec., supplied feed gas (air): 7.20 Nl/min.; and, amount of a part of the product gas used to scavenge the adsorbers for regeneration: 0.5 Nl/min.

As a result of the purification, 1.08 Nl/min. of nitrogen with mean oxygen content of 2.0% was obtained through the tank, with the ratio of acquisition being 15%; and, the adsorption efficiency being 15.5 $Nm^3/m^3(MSC)H$.

The present invention increases the ratio of acquisition by 41% and the adsorption efficiency by 43%, and further decreases power consumption by 41% in comparison with the conventional method.

EXAMPLE VII

Nitrogen was purified from the feed gas (nitrogen: 95% and oxygen: 5%) with two main adsorbers being filled with 1.9 l of MSC each and one supplementary adsorber with 0.39 l of MSC. Regeneration was conducted by communicating the adsorbers with atmosphere and further by scavenging the adsorbers with product gas. The purification was performed under the following conditions:

adsorption pressure: 3 $kg/cm^2G$, critical purity P of the product gas discharged directly from the main adsorber: 0.12% $O_2$, critical purity P' of the product gas discharged from the supplementary adsorber: 0.11% $O_2$, time for adsorption by the main adsorber alone: 58 sec., time for adsorption by the main adsorbers and the supplementary adsorber connected in series: 60 sec., supplied feed gas: 4.64 Nl/min., and amount of a part of the product gas used to scavenge the adsorbers for regeneration: 0.5 Nl/min.

As a result of the purification, 0.73 Nl/min. of nitrogen with mean oxygen content of 0.10% was obtained, with the ratio of acquisition being 15.8% and the adsorption efficiency being 10.5 $Nm^3/m^3(MSC)H$.

In a conventional system, on the other hand, purification of nitrogen was carried out, with two adsorbers being filled with 2.095 l of MSC each, under the following conditions:

adsorption pressure: 3 $kg/cm^2G$, adsorption time: 118 sec., supplied feed gas: 4.09 Nl/min., and amount of a part of the product gas used to scavenge the adsorbers: 0.5 Nl/min.

As a result, 0.56 Nl/min. of nitrogen with mean oxygen content of 0.10% was obtained, with the ratio of acquisition being 13.7% and the adsorption efficiency being 8.0 $Nm^3/m^3(MSC)H$.

The present invention increases the ratio of acquisition by 15% and the adsorption efficiency by 31%; and, further decreases power consumption by 15% in comparison with the conventional method.

According to the second embodiment shown in FIGS. 6 and 7, upper-end portions of the main adsorbers 1 and 2 and lower-end portions of the main adsorbers 1 and 2 are communicated with each other through valves 15 and 25 for the purpose of pressure equalization, as shown in FIG. 6. However, it is noted that the upper-end portion of the main adsorber 1 can be communicated with the upper-end portion of the main adsorber 2 and the lower-end portion of the main adsorber 1 can be communicated with the lower-end portion of the main adsorber 2 for the same purpose.

Furthermore, according to the foregoing second embodiment, the pressure equalization is carried out in two stages. They are: (a) communicating the unregenerated supplementary adsorber 3 with the regenerated main adsorber 2, and then (b) communicating the unregenerated main adsorber 1 with the above-stated main adsorber 2.

However, the main adsorber 1 and the supplementary adsorber 3 can be connected simultaneously with the regenerated main adsorber 2, instead.

Furthermore, although the second embodiment has a combination of the two main adsorbers and one supplementary adsorber, technical concepts of the present invention also extend to the use of additional adsorbers. For example, a combination of three main adsorbers, and one supplementary adsorber can be used, as can a combination of three main adsorbers and two supplementary adsorbers.

As stated above, in comparison with conventional methods, the present invention has advantages with respect to uniformity of purity of the product gas, the ratio of acquisition, the adsorption efficiency, the power consumption, and so on.

Embodiments of the invention in which an exclusive property or privilege is claimed are defined by the following:

1. A process for purifying a gas, comprising the use of a main adsorber and a supplementary adsorber in which the supplementary adsorber contains less adsorbent therein than said main adsorber, said process comprising the steps of:

introducing a feed gas into the main adsorber and discharging a product gas out of an outlet of the main adsorber;

connecting the main adsorber in series with the supplementary adsorber when purity of the product gas substantially reaches a predetermined critical value P; and, removing the product gas from an outlet of the supplementary adsorber until the product gas substantially reaches a predetermined critical value.

2. A process according to claim 1, wherein:

molecular sieving carbon (MSC) is used as the adsorbent;

the supplementary adsorber is filled with about 5 to 50% of the adsorbent being placed in the main adsorber; and, adsorption time for the supplementary adsorber is about 20 to 70% of the adsorption time for the main.

3. A process for purifying a gas including a regular cycle of adsorption and regeneration using at least two main adsorbers and at least one supplementary adsorber having less adsorbent therein than the main adsorbers, said process comprising the steps of:

carrying out an adsorption process at a regenerated one of said main adsorbers with feed gas $G_0$ introduced thereinto and simultaneously and in parallel carrying out a regeneration process at the other of said main adsorbers and said supplementary adsorber;

connecting said supplementary adsorber in series with said one main adsorber to continually take out a product gas from an outlet of the supplementary adsorber said regeneration process at said other adsorber being continued, when product gas discharged from the outlet of said one main adsorber reaches or nears a predetermined critical purity;

completing the adsorption process when the product gas discharged from the outlet of said supplementary adsorber reaches or nears a predetermined critical purity; and switching said one main adsorber and said supplementary adsorber to the regeneration process and switching said other main adsorber to an adsorption process after pressure-equalization.

4. A process for purifying of gas according to claim 3, wherein molecular sieving carbon (MSC) is used as an adsorbent;

the supplementary adsorber is filled with about 5 to 50% of the adsorbent being placed in said main; and, the predetermined critical purity of the product gas at the outlet of a main adsorber and the predetermined critical purity of the product gas at the outlet of the supplementary adsorber are substantially the same.

* * * * *